United States Patent [19]
Cox et al.

[11] Patent Number: 5,265,925
[45] Date of Patent: Nov. 30, 1993

[54] ENERGY DISSIPATING BUMPER ASSEMBLY

[75] Inventors: Craig M. Cox, Ann Arbor, Mich.; Gerogry A. Kaepp, Melbourne, Fla.

[73] Assignee: Ford Motor Company, Dearborn, Mich.

[21] Appl. No.: 972,274

[22] Filed: Nov. 5, 1992

[51] Int. Cl.$^5$ .............................................. B60R 19/06
[52] U.S. Cl. .................... 293/120; 293/132; 264/328.1
[58] Field of Search ............... 293/120, 121, 132, 135, 293/136

[56] References Cited

U.S. PATENT DOCUMENTS

| | | | |
|---|---|---|---|
| 3,666,310 | 5/1972 | Burgess et al. | 293/120 |
| 3,856,613 | 12/1974 | Weller | 293/120 |
| 4,268,078 | 5/1981 | Nomura et al. | 293/120 |
| 4,268,079 | 5/1981 | Nomura et al. | 293/120 |
| 4,325,574 | 4/1982 | Umemoto et al. | 293/120 |
| 4,328,986 | 5/1982 | Weller et al. | 293/120 |
| 4,652,031 | 3/1987 | Loren et al. | 293/120 |
| 4,671,550 | 6/1987 | Molnar | 293/120 |
| 5,067,759 | 11/1991 | Fleming | 293/109 |

FOREIGN PATENT DOCUMENTS

| | | |
|---|---|---|
| 3843535 | 6/1990 | Fed. Rep. of Germany . |
| 57-87742 | 6/1982 | Japan . |
| 1-257018 | 10/1989 | Japan . |
| 2-215519 | 8/1990 | Japan . |
| 2027516 | 2/1980 | United Kingdom . |

Primary Examiner—Robert R. Song
Attorney, Agent, or Firm—Daniel M. Stock; Roger L. May

[57] ABSTRACT

An energy absorbing subassembly fastened securely to the front and rear of an automotive vehicle having a load isolation member extending laterally across the vehicle, and at least one load transferring web carried within the load isolation member. Impact forces are spread over a relatively large volume of load isolation material because loads are transferred there through the relatively large projected area of the load transferring web.

10 Claims, 3 Drawing Sheets

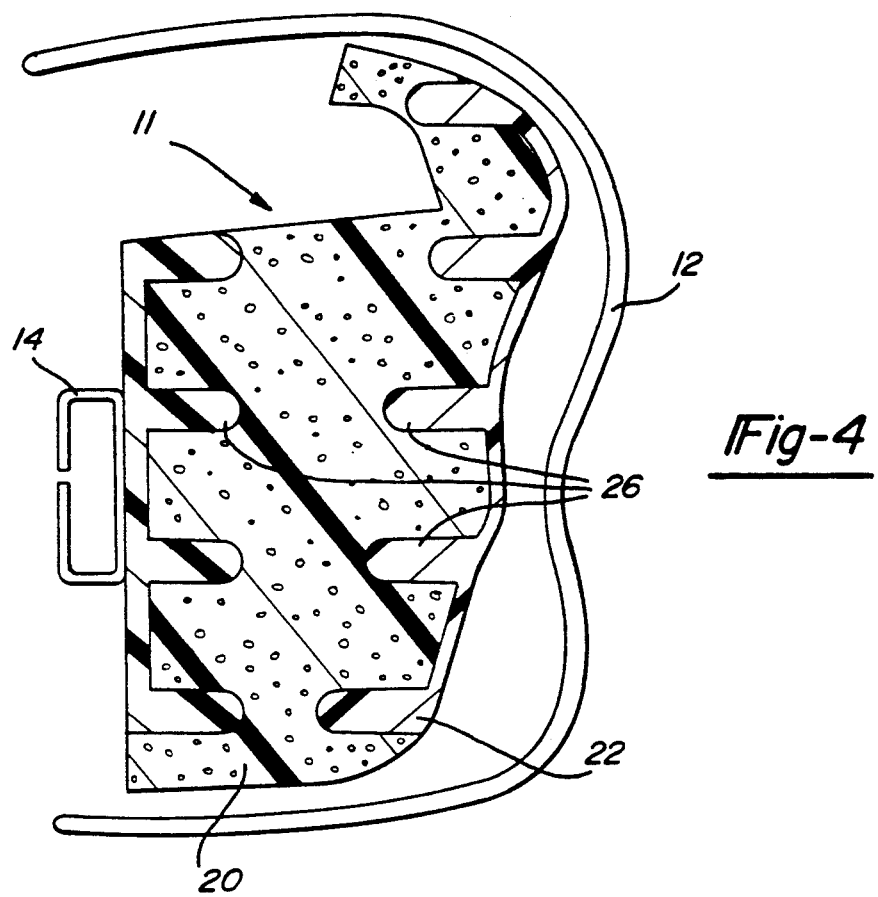
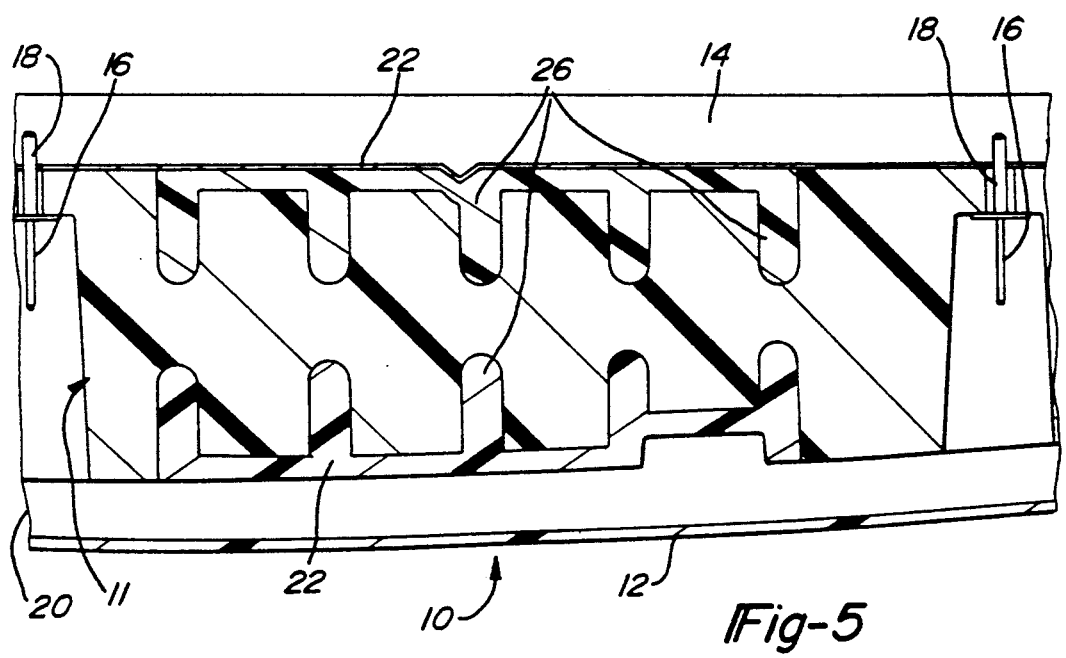

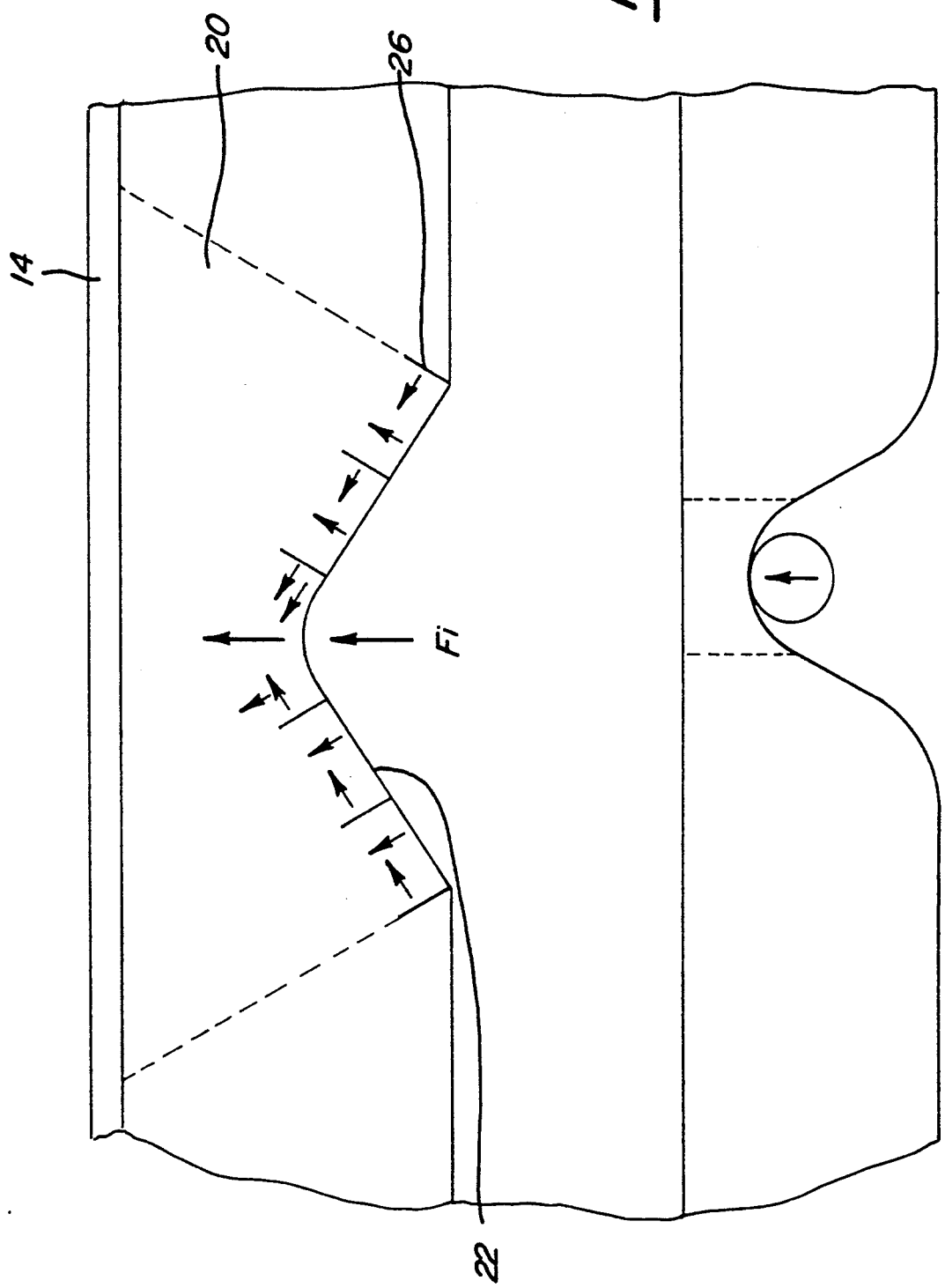

ENERGY DISSIPATING BUMPER ASSEMBLY

BACKGROUND OF THE INVENTION

1. Field of the Invention

The present invention relates to energy absorbing bumpers, and more specifically to energy dissipating structures embodied in such vehicle bumpers.

2. Description of Related Art

Energy absorbing bumpers have been used on automotive vehicles for many years to attenuate collision energies. Flexible polymeric materials and plastic foams have been employed as energy isolation members to dissipate these energies. Generally, energy isolation members employing foam have been mounted to the front and rear of a vehicle and covered externally by a flexible cover. In the event of a collision, the object contacting the vehicle elastically stresses the flexible cover laterally in tension and deflects it inward to the vehicle where it contacts the energy isolation member. The foam energy isolation member is subsequently compressed wherein the kinetic energy of the vehicle is given up to mechanical work and heat through thousands of mechanical contacts within the foam; the energy is dissipated before it can be transferred to the vehicle body structure. After the vehicle comes to rest, contact ceases between the vehicle and the outside object, and both the energy isolation member and the flexible cover rebound to substantially their original shape.

U.S. Pat. No. 4,268,078 to Nomura is exemplary of bumpers like the one described above. Typically, these bumpers perform better during collisions with objects having relatively large projected contact area, like walls and other vehicles. Larger volumes of foam are involved in dissipating collision energies when presented by the large contact area of a wall; more mechanical contacts within the compressed foam results in lessened opportunity for kinetic energy to be transferred to the vehicle body structure. However, this type of bumper performs less optimally when colliding with objects having smaller projected contact area, like poles or the edges of buildings. The energy isolation member is compressed locally about the area of load application leaving much of the foam uninvolved in the collision. Less foam is available to convert the vehicle's kinetic energy to mechanical work and heat. Consequently, the kinetic energy is converted to mechanical work within the body structure of the vehicle which may result in plastic deformation of sheet metal body components.

The condition cited above is effected because smaller volumes of foam are involved in changing the vehicle's momentum. Collision contact time with the energy isolation member is greatly reduced. Impulsive forces, directed substantially longitudinally inward to the vehicle, are directly transmitted as sudden impacts. Coupling the impulsive loads with the reduced contact area increases compressive stresses on the foam material, and may in some cases lead to a complete collapse, and possible shearing, of the foam energy isolation member locally about the area of contact. Consequently, and regardless of shearing, the impulsive loads perform mechanical work on the sheet metal body components leading to plastic deformation in a typical "wraparound" pattern.

It would be desirable to develop a device for a vehicle bumper that would dissipate the energy of collisions with poles and the like through a larger volume of energy absorbing material than would otherwise be possible.

SUMMARY OF THE INVENTION

Responsive to deficiencies in the prior art, a device for a vehicle bumper has been discovered that dissipates the energy of collisions with objects of small projected contact areas, such as poles, through a relatively large volume of energy absorbing material. The inventive device makes use of an energy absorbing subassembly for a vehicle bumper comprising a load isolation member extending laterally across the vehicle, means for securely fastening the energy absorbing subassembly to the vehicle, and at least one load transferring web carried within the load isolation member. The energy absorbing subassembly is housed within a flexible cover, which is substantially U shaped in cross section, and also extends laterally across the vehicle. The flexible cover is securely fastened to the vehicle by conventional means.

Certain advantages are gained in using the present invention during collisions with objects having relatively small projected contact areas. During such collisions, impulsive loads are directed substantially longitudinally inward to the vehicle. The flexible cover is elastically stressed laterally in tension and deflects inward making contact with the energy absorbing subassembly housed there within. Within the energy absorbing subassembly, the impulsive loads are further transmitted, in turn, through a load transferring web to the load isolation member. Nearly the full projected area of the load transferring web is driven into the load isolation member, involving a larger volume of foam than would be the case without the load transferring web. The kinetic energy of the vehicle is converted to mechanical work and heat within the energy isolation member. Further, contact time with the energy isolation member is increased resulting in diminished impulsive loads and decreased compressive stresses on the foam. The foam is less likely to shear and mechanical work is not performed on the sheet metal body components.

According to another aspect of the invention, there is provided a method of making an energy absorbing subassembly for a vehicle bumper comprising the steps of: forming a pair of dies which when placed in facing relationship define a mold shaped generally like a vehicle bumper; placing at least one relatively stiff web member within the mold along with sufficient polypropylene pellets to form the vehicle bumper; closing the dies; and injecting steam and hot air to foam the polypropylene pellets to define a load isolation member in surrounding relationship with respect to the load transferring web.

BRIEF DESCRIPTION OF THE DRAWINGS

FIG. 4 is a sectional view taken along line 4—4 in FIG. 1.

FIG. 5 is a partial sectional view taken substantially along line 5—5 in FIG. 1.

FIG. 6 is a diagrammatic sketch showing the bending of the load transferring web during collision loading and the subsequent load transfer directions

DETAILED DESCRIPTION OF THE PREFERRED EMBODIMENT

Figure 1:
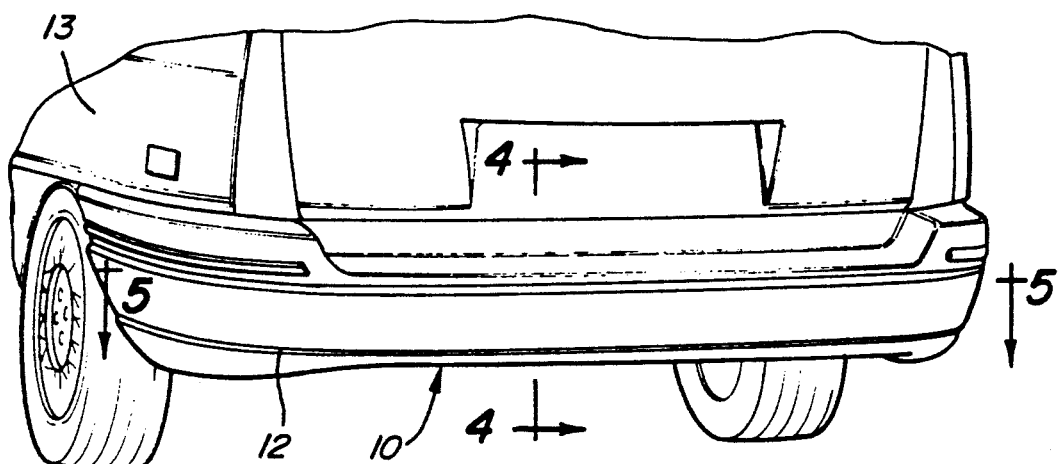
FIG. 1 is a perspective view of a bumper assembly mounted on the rear of an automobile.
Figure 2:
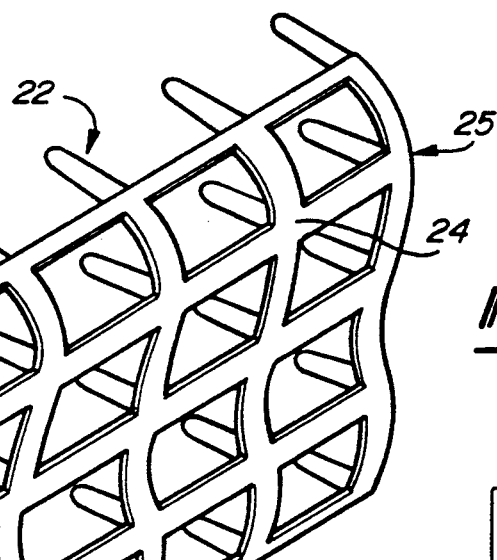
FIG. 2 is a perspective view of a load transferring web member.

According to the present invention and as illustrated in FIG. 1 a bumper assembly 10 is mounted to the rear of an automobile 13. Extending laterally across the vehicle, the bumper assembly 10 comprises an elongate flexible cover 12, an energy absorbing subassembly 11 (as may best be seen in FIGS. 4 and 5), FIG. 4, and means 16 for fastening the energy dissipating subassembly 11 to the automobile 13. Similar assemblies are also mounted to the front of the vehicle, although not shown here. The flexible cover 12 is of the usual type used on automobile bumpers and is made of flexible plastic or resilient plastic foam to form a substantially U-shaped cross section as may best be seen in FIG. 4. Conventional means are employed to fixedly secure the flexible cover 12, in a suspended fashion, to the body structure of the automobile 13. These securing means can include, but are not limited to push pins, nuts and bolts, tongue in groove, screws or any of the above in combination.

Housed within the U-shaped flexible cover 12, the energy dissipating subassembly 11 comprises at least one load transferring web 22 and a load isolation member 20. The load isolation member 20 uses foamed polypropylene pellets in its manufacture and is shaped generally to follow and fill the inner contour of the flexible cover 12. Although other choices of energy absorbing materials are possible, foamed polypropylene has been found acceptable for use in the automotive industry. Firm, yet resilient and highly compressible, polypropylene foam provides light weight isolation of collision loads to the vehicle body structure.

Held in surrounded relationship with the load isolation member 20, which may be formed as a single structure or as a plurality of discrete structures and constructed as single units, load transferring web 22 is configured generally as a lattice defining a planar structure shown generally at 25. A plurality of vertically planar, intersecting strips 24 make up the lattice wherein projections 26 are attached at one end to each intersection. The projections 26 extend normally to the planar structure 25 and inwardly to the load isolation member 20. The load transferring web 22 is made of tough, relative stiff, fracture resistant material that resists bending and breaking during impact loading. Cured, two component, liquid urethane polymer is sufficient for the load transferring web 22 although other materials are possible.

Conventional fasteners, shown generally at 16 in FIG. 5, secure the energy absorbing subassembly 11 to an elongate beam 14. The beam 14 is manufactured as part of the usually metallic automobile body structure where it extends laterally the width of the vehicle. Shown best in cross section, FIG. 4, the beam 14 is depicted as having a greater area moment of inertia, and thereby greater strength, in the vertical direction. Variations in this cross section are likely. Typically the strength of beam 14 is optimized in the direction of collision loading; longitudinal to the automobile 13. The proportions of the beam 14 in FIG. 4 are used only to illustrate where and how the energy absorbing subassembly 11 is mounted to the automobile structure; more efficient beam geometries are possible. The conventional fastener means 16 used to secure the energy absorbing subassembly 11 to the beam 14 can include, but are not limited to pop rivets, push pins, screws, nuts and bolts, tongue in groove, adhesives or any of the above in combination.

Figure 3:
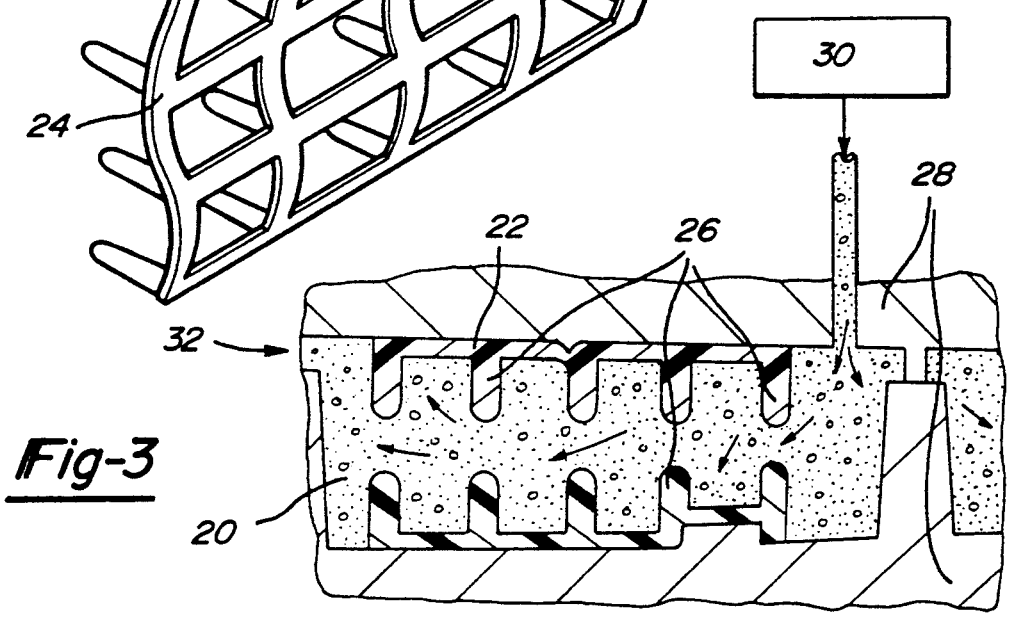
FIG. 3 is a partial plan view of the molding process transversely sectioned.

Turning to FIG. 3, it is illustrated that the load transferring web 22 is permanently formed and carried, within the load isolation member 20 during the manufacture of the energy absorbing subassembly 11. To accomplish this, a pair of dies 28 are positioned face to face to define a mold 32 which is generally the size and shape of a vehicle bumper. Placed within the mold 32 are at least one prefabricated and relatively stiff load transferring web 22 and sufficient polypropylene pellets to form the load isolation member 20. The dies 28 are closed and the contents therein are exposed to a source of high pressure steam and hot air 30. When exposed to a source of high pressure steam and hot air 30 the polypropylene pellets fuse together, trap air, and add bulk until the mold 32 is filled. The load isolation member 20 is molded in situ about the load transferring web 22 forming the energy dissipating subassembly 11 in which both retain the positions they had originally within the mold 32.

In the event of a collision, objects having relatively small projected contact areas direct impulsive loads substantially longitudinally inward to a vehicle equipped with the present inventive bumper. The flexible cover 12 is elastically stressed laterally in tension and deflects inward making contact with the energy absorbing subassembly 11 housed there within. Within the energy absorbing subassembly 11, the impulsive forces are further transmitted, in turn, through the load transferring web 22 to the load isolation member 20. A larger volume of foam is compressed with the load transferring web 22 than without, because nearly the full projected area of the web 22 is driven into the energy isolation member 20. The inwardly extending projections 26 guide the load transferring web 22 into the foam inhibiting bending of the load transferring web 22 about the point of load application. The bending that does occur further enhances the effectiveness of the load transferring web 22. As the lattice structure 25 is deflected inward, bending the web, the attached ends of the projections 26 rotate medially toward the point of load application thereby changing the attitude of load transfer as may best be seen in FIG. 6. Forces are consequently transmitted normally, as shown by the arrows in FIG. 6, from the lengths of the rotated projections 26 into a greater depth, and therefor greater volume, of foam. With more foam involved, the kinetic energy of the vehicle is dissipated within the energy isolation member, impulsive loads and compressive stresses are diminished, and mechanical work is not performed on the sheet metal body components.

The foregoing description is but one of many possible embodiments of the present invention. Accordingly, it should be recognized that many changes and modifications can be made to the described embodiment without straying from the scope of the invention as laid out in the following claims.

What is claimed is:

1. An energy dissipating subassembly for a vehicle bumper comprising;
   a load isolation member extending laterally across the vehicle;
   means for securely fastening the energy absorbing subassembly to the vehicle; and at least one load transferring web carried within the load isolation member, the load transferring web comprising a lattice-like, generally planar, structure having a plurality of projections extending normally therefrom.

2. An energy dissipating subassembly as defined in claim 1 wherein the load isolation member is molded in situ about the load transferring web.

3. An energy dissipating subassembly as defined in claim 1 wherein the load transferring web is formed from a cured, two component liquid urethane polymer.

4. An energy dissipating subassembly as defined in claim 1 wherein the load isolation member is formed of foamed polypropylene.

5. An energy dissipating subassembly as defined in claim 1 and further comprising a plurality of laterally spaced load transferring web.

6. A bumper assembly for an automotive vehicle comprising means for mounting the bumper assembly on the vehicle;

an outer cover member; and an energy dissipating subassembly carried within the cover member and including:

a load isolation member extending laterally across the vehicle; and at least one load transferring web carried within the load isolation member, the load transferring web comprising a lattice-like, generally planar, structure having a plurality of projections extending normally therefrom.

7. An energy dissipating subassembly as defined in claim 6 wherein the load isolation member is molded in situ about the load transferring web.

8. An energy dissipating subassembly as defined in claim 6 wherein the load transferring web is formed from a cured, two component liquid urethane polymer.

9. An energy dissipating subassembly as defined in claim 6 wherein the load isolation member is formed of foamed polypropylene.

10. An energy dissipating subassembly as defined in claim 6 and further comprising a plurality of laterally spaced load transferring web.

* * * * *